United States Patent

Theisen et al.

[11] Patent Number: 5,497,725
[45] Date of Patent: Mar. 12, 1996

[54] SIGHT INDICATOR

[76] Inventors: Terry J. Theisen, 2618 Teague, Houston, Tex. 77041; Joe D. Dumoit, 6507 Northway, Spring, Tex. 77389; David M. Denning, 19426 Whitewood, Spring, Tex. 77379

[21] Appl. No.: 261,932

[22] Filed: Jun. 17, 1994

[51] Int. Cl.$^6$ .................. G01D 21/00; F16K 37/00
[52] U.S. Cl. ........................... 116/277; 116/204
[58] Field of Search ................ 116/204, 267, 116/277, 285; 137/553, 557; 73/DIG. 5

[56] References Cited

U.S. PATENT DOCUMENTS

| | | | |
|---|---|---|---|
| 188,154 | 3/1877 | Leavitt et al. | 116/277 X |
| 2,920,484 | 1/1960 | Reichert | 73/319 |
| 3,420,103 | 1/1969 | Peschek | 73/319 |
| 3,499,415 | 3/1970 | Gutkowski | 116/70 |
| 3,785,332 | 1/1974 | Silverwater | 116/70 |
| 3,964,312 | 6/1976 | Sebek | 73/319 X |
| 3,974,795 | 8/1976 | Crisp . | |
| 3,980,040 | 9/1976 | Read . | |
| 4,156,872 | 5/1979 | Helwig | 340/393 |
| 4,195,518 | 4/1980 | Fees | 73/209 |
| 4,457,171 | 7/1984 | Gebauer | 73/305 |
| 4,512,190 | 4/1985 | Sledmere | 73/319 |
| 4,651,670 | 3/1987 | Silverwater | 116/268 |

FOREIGN PATENT DOCUMENTS

| | | | |
|---|---|---|---|
| 1014763 | 8/1952 | France | 116/277 |
| 841953 | 7/1954 | Germany | 73/DIG. 5 |
| 3337909 | 5/1985 | Germany | 137/557 |
| 363816 | 8/1962 | Switzerland | 73/DIG. 5 |
| 916859 | 3/1982 | U.S.S.R. | 137/553 |

*Primary Examiner*—William A. Cuchlinski, Jr.
*Assistant Examiner*—Willie Morris Worth
*Attorney, Agent, or Firm*—Kenneth H. Johnson

[57] ABSTRACT

A device for providing visual indication and record of the actuation of a tank vent opening the comprising a rod contacting a tank vent pallet at one end and a magnet affixed to another end of said rod, which moves in a chamber adjacent to a set of vertically positioned rotationally mounted magnetic wafers with visually distinguishable sides. The magnets all have the same polarity then the rising magnet occasioned by the opening tank vent will flip the wafers as far as the magnet travels, but will not affect the wafers when it goes down after the vent closes.

5 Claims, 2 Drawing Sheets

SIGHT INDICATOR

BACKGROUND OF THE INVENTION

1. Field of the Invention

The present invention relates to tank venting valves for relieving the internal pressure in tanks at a predetermined pressure. More specifically the invention is concerned with whether a venting valve has opened and how much.

2. Related Art

There are several types of pressure relief valves for atmospheric or low pressure storage tanks. One of the basic designs is known as a "weight loaded tank vent". The design utilizes a weighted cover over a nozzle. The cover, also known as a pallet, forms a barrier to the nozzle opening. The weight of the pallet determines at what pressure the pallet will lift open to relieve pressure in the tank. The opening pressure is known as the "set pressure". The set pressure can easily be determined by dividing the weight of the pallet assembly by the open area of the nozzle. If a higher set pressure is desired more weight is added to the pallet.

Other types of pressure relieving devices include a spring loaded tank vent and a pilot operated tank vent. The spring loaded type is used for set pressures above that which is practical for weight loaded operation due to either a high set pressure where there is not enough room for the weights on the pallet, or where the size of the vent nozzle dictates a large weight on the pallet.

Pilot operated tank vents utilize the tank pressure acting on an area larger than the nozzle area to create a higher downward force to hold down a pallet or seat plate against the tank pressure. The set pressure is adjustable by means of a spring in the pilot.

Any of the three types may be vented to the atmosphere or piped into headers for vapor recovery or burning. Generally these valves open, make an emission and close without any record and can present a source of atmospheric contamination.

It is an advantage that the present device requires no electrical or auxiliary mechanical power to operate and will not interfere with the breather vents function or relief capacities. It is a feature that the present device provides a visible display that remains after the vent is closed to show that it was open and provide an indication of the extent of the opening. These and other features and advantages will become apparent from the following descriptions.

SUMMARY OF THE INVENTION

Briefly the present invention is a device for providing visual indication and record of the actuation of a tank vent opening comprising a rod for contacting a tank vent pallet at a distal end, a magnet affixed to a proximal end of said rod, a chamber to allow linear movement of a said rod and magnet therein in response to movement of said pallet, a set of vertically positioned rotationally mounted wafers, each of said wafers having a magnet associated therewith, having two sides with distinguishable indices on each side and having the same polarity, said set being positioned adjacent to and within a magnetically actuatable distance of said rod magnet.

The wafers have two sides which have some indicia thereon to distinguish one from the other, such a color, e.g. black on the closed side-indicating no movement of the vent pallet and yellow on the open side indicating the pallet opened. In a preferred embodiment the wafer magnets and the rod magnet will have same polarity, and the wafers are arranged on the rotatable mounting such that as the rod magnet is raised by the opening vent pallet, each wafer magnet is repulsed by the rod magnet as it passes and causes the wafer to flip over, showing the indicia on the "open" side. The vent pallets are designed to close and when this happens the rod and rod magnet will pass by the wafers, but because the polarity is the same there will be no magnetic effect. The "open" indicia will remain until observed and returned to "closed" by an inspector. Since the wafers are preferably enclosed with a transparent surface over them for protection, the return of the wafers to "closed" is conveniently achieved by passing a magnet of the appropriate polarity over them, usually the opposite polarity is used to attract the wafers back to "closed".

PREFERRED EMBODIMENTS

Figure 1:
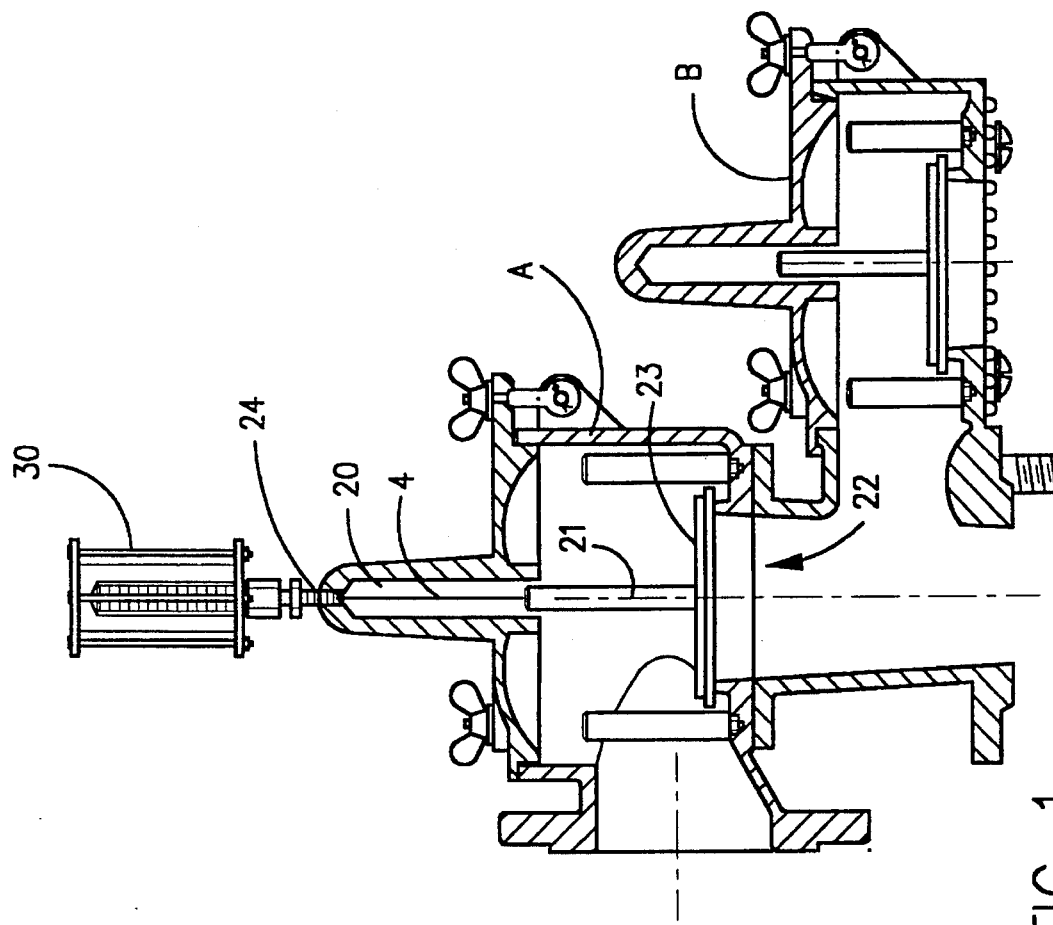
FIG. 1 is a cross sectional elevation of weighted relief valve with one embodiment of the present sight indicator in place on a tank vent.

FIG. 1 shows a relief valve with both pressure A and vacuum B relief valves. The pressure relief valve 30 is a weighted pallet 23 seated on a nozzle 22. The shaft 21 is guided up in the channel 20. This particular relief valve is a pipe away. A sight indicator 30 is seated in a hole 24 tapped in the top of the channel 20. The sight indicator is threaded into the hole, and rod 4 seats against the top of shaft 21.

Figure 2:
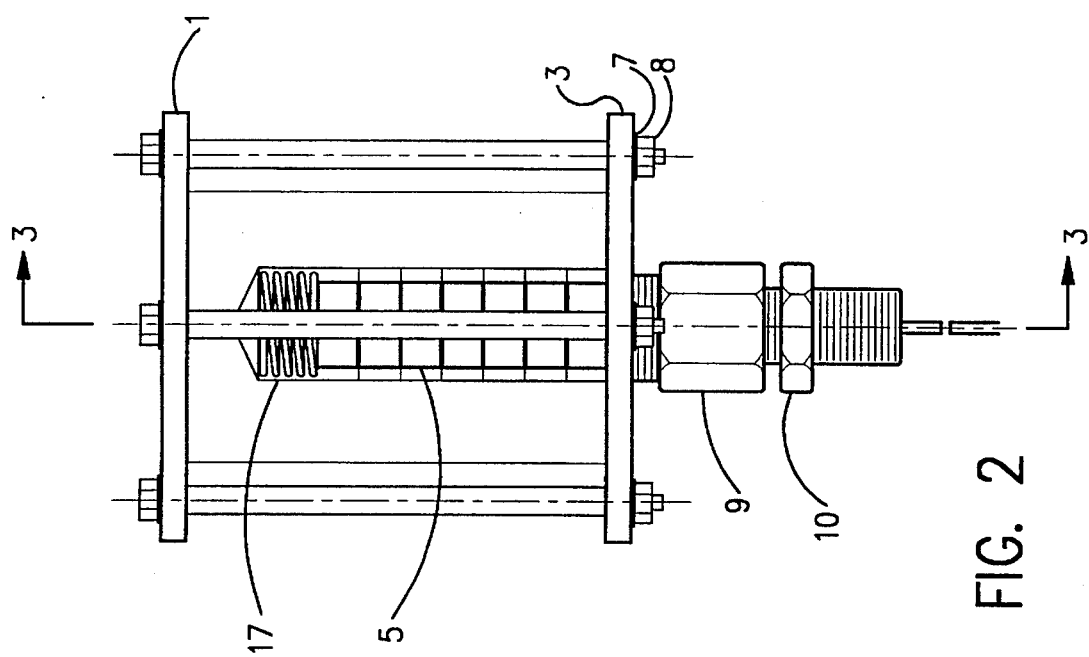
FIG. 2 is a cross sectional elevation of one embodiment of the present sight indicator.
Figure 3:
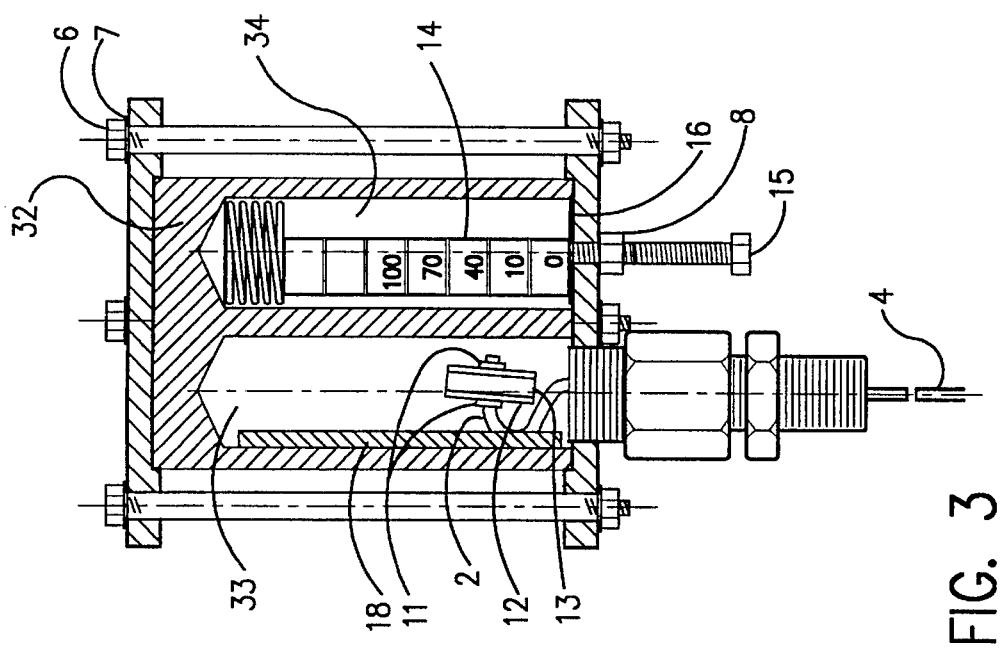
FIG. 3 a cross sectional elevation of the embodiment of FIG. 2 along line 3—3.

Referring to FIGS. 2 and 3, the sight indicator is shown in detail. When the shaft 21 is raised by the rising of the pallet 23 to let off pressure, the rod 4 and magnet 13 rise. As the magnet passes by a series of plastic covered magnetic wafers 14 which have the same polarity as the magnet 13 thus repelling them. As the wafers are repelled they flip to show their underside which is a different color than the unflipped side. When the pallet 23 closes, the magnet 13 drops down but because the wafers have the opposite polarity they remain flipped. This gives a record that the valve was open and a qualitative indication of how much.

The wafers are pivotally mounted at their mid point (not shown) and flip around the axis to either position. The magnetic wafers are reset to blank with a second magnet that is applied outside. The body of the device is comprised of a block of clear plastic material 32 with two chambers, 33 and 34. Chamber 33 is provided for the magnet 13 to move within and is adjacent to and within magnetic force distance to chamber 34 in which the magnetic wafers 14 are mounted. The magnetic wafers are vertically mounted in rack 5, which is seated on disk 16 and biased against spring 17. The disk 16 can be adjusted within chamber 34 by bolt 15, which is threaded through bottom plate 3. This allows for calibration of the scale for each vent. The bottom plate is secured to top plate 1 by bolts 6 and nuts 8 and washers 7. Reducer 9 is threadably engaged in bottom plate 3 and serves to contain the magnet 13 in chamber 33. Swivel 10 is threadably mounted on reducer 9. The swivel is threadedly attachable to a hole tapped in the cover of a tank vent. The chamber 33 is provided with a guide 18 against which the neck 2 of rod 4 rides. This element is omitted when the magnet 13 is of the same cross section an only slightly smaller than the chamber. The magnet 13 is held in place by nuts 11 and washers 12.

Figure 4:
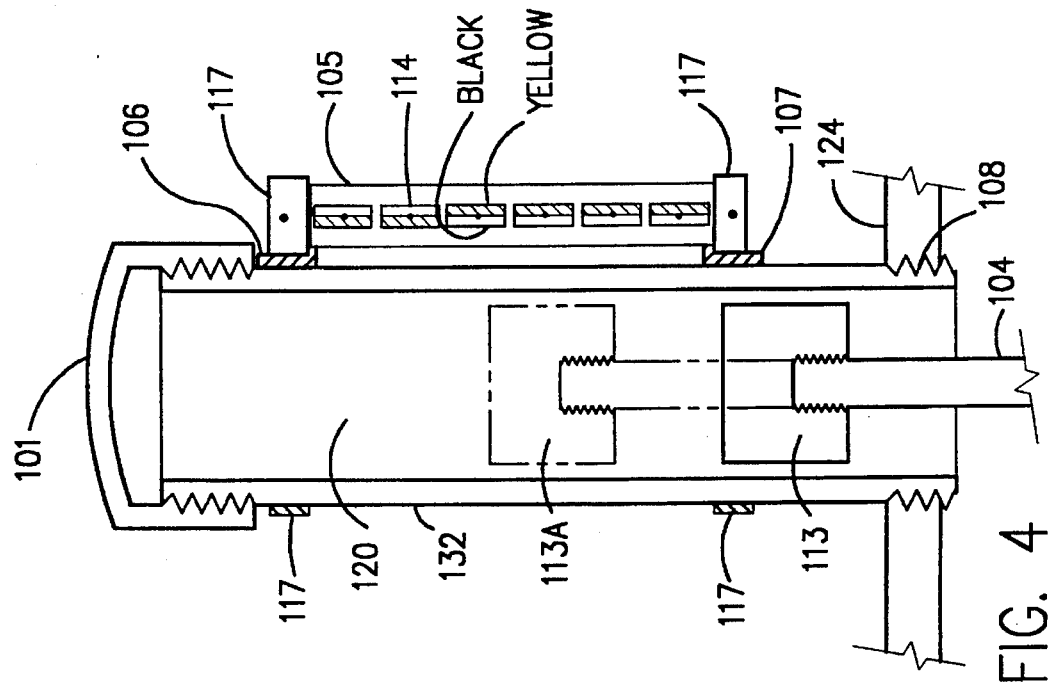
FIG. 4 is a cross sectional elevation of another embodiment of the present sight indicator.

In the alternative embodiment shown in FIG. 4, the body of the device is a conduit or pipe 132 which with cap 101 forms the chamber 120 in which the rod 104 and magnet 113 move in response to the movement of the vent pallet (not shown). The pipe is adapted to seat in a vent cap or cover 124, for example by being engaged by threads 108. In this embodiment the magnetic wafers 114 are arrayed in the rack 105, which has an upper extension 106 and lower extension 107 adjacent to the pipe 132. Band clamps 117 are tighten about the pipe and extension 106 and 107 to hold the rack in place. The wafers are calibrated by loosening the band clamps and repositioning the rack as desired.

In FIG. 4 the rod 104 and magnet 113A (dotted lines) are shown to have been lifted into the chamber 132 and returned to the closed position, however, the magnetic wafers 114 that were flipped from black (closed) to yellow (open) and stay flipped because the return of the magnetic 13 down does not affect them, since they have the opposite polarity.

The device is installed by threading the fitting directly onto the cover assembly on the breather vent pressure or vacuum side. The device senses the pallet movement and flips teflon coated metallic wafers that display the percent of travel that the pallet has opened. When the valve recloses, the wafers remain flipped until manually reset. Resetting the device is done by simply passing a magnet in front of the wafers. This unit is an excellent choice for locations that do not have ready access to electrical power, or in sensitive areas where it is necessary to know to what extent the vent has opened and relieved. The device is easily completely sealed and does not allow vapors in the system to escape to atmosphere. The indicator wafers are preferably hermetically sealed away from the system process to ensure corrosion protection.

The sight glass may be constructed of any strong chemical and weather resisting material such as tempered glass, acrylics or the like. With the exception of the magnet, exposed surfaces are all desirably stainless steel and acrylics, although all stainless steel, Derakane or other special non-ferrous metals are suitable.

The invention claimed is:

1. A device comprising:

a rod for contacting a tank vent pallet at a distal end, a first magnet affixed to a proximal end of said rod, said rod and said first magnet being slidably mounted within a first chamber in a transparent body to allow linear movement of said rod and first magnet therein in response to movement of said pallet, a second chamber in said transparent body adjacent to and extending along said first chamber, and means for mounting a set of vertically positioned rotationally mounted wafers in said second chamber, each of said wafers comprising an individual second magnet having two sides with opposite polarities and distinguishable indices on each side, said set being positioned adjacent to and having a pole of each second magnet within a magnetically actuatable distance of one pole of said first magnet.

2. The device according to claim 1 wherein when the device is set for operation said poles of said second magnets have the same polarity as the adjacent pole of said first magnet.

3. The device according to claim 1 wherein after actuation of the wafers said poles of said second magnets have a different polarity than the adjacent pole of said first magnet.

4. The device according to claim 1 comprising set screw means for rectilinearly adjusting said set of wafers along said second chamber.

5. A device comprising:

a rod for contacting a tank vent pallet at a distal end, a first magnet affixed to a proximal end of said rod, said rod and said first magnet being slidably mounted within a body having a single chamber comprising a substantially vertical elongated conduit closed at its upper end and open at its lower end to allow linear movement of said rod and first magnet therein in response to movement of said pallet, and a means for supporting a set of vertically positioned rotationally mounted wafers, said support means being mounted onto said body adjacent said chamber, each of said wafers comprising an individual second magnet having two sides with opposite polarities and distinguishable indices on each side, said set being positioned adjacent to and having a pole of each second magnet within a magnetically actuatable distance of one pole of said first magnet, said pole of each of said second magnets having the same polarity as said one adjacent pole of said first magnet when the device is set.

* * * * *